Feb. 2, 1926.
V. K. ZWORYKIN
1,571,463
OSCILLATION GENERATOR SYSTEM
Filed July 19, 1921
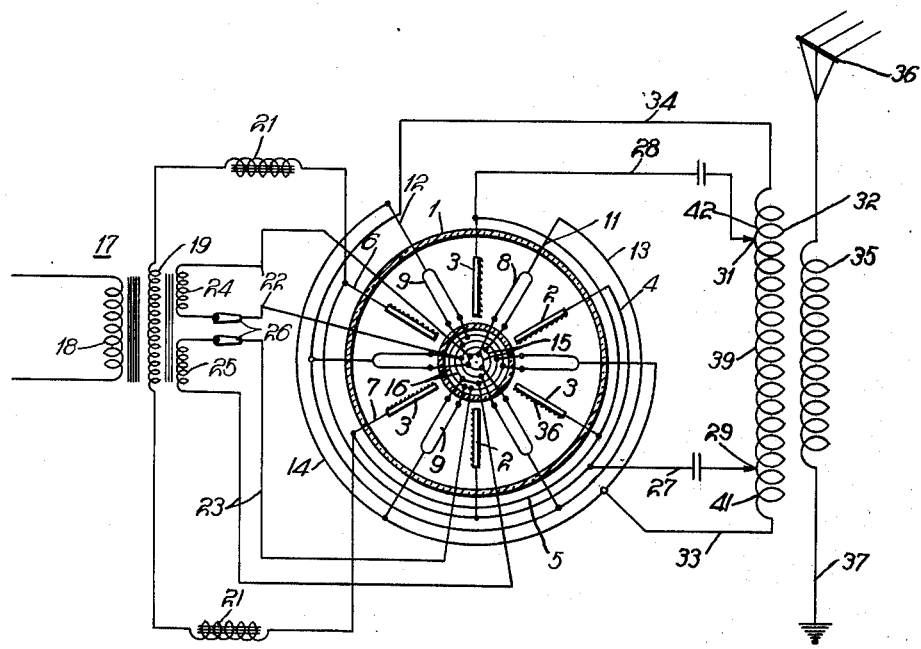
WITNESSES:
H. B. Funk.
H. L. Godfrey
INVENTOR
Vladimir K. Zworykin.
BY
Wesley G. Carr
ATTORNEY Patented Feb. 2, 1926.

1,571,463

UNITED STATES PATENT OFFICE.

VLADIMIR K. ZWORYKIN, OF PITTSBURGH, PENNSYLVANIA, ASSIGNOR TO WESTINGHOUSE ELECTRIC & MANUFACTURING COMPANY, A CORPORATION OF PENNSYLVANIA.

OSCILLATION-GENERATOR SYSTEM.

Application filed July 19, 1921. Serial No. 485,948.

*To all whom it may concern:*

Be it known that I, VLADIMIR K. ZWORYKIN, a citizen of Russia, and a resident of Pittsburgh, in the county of Allegheny and State of Pennsylvania, have invented a new and useful Improvement in Oscillation-Generator Systems, of which the following is a specification.

My invention relates to oscillation generator systems and particularly to an improved vacuum-tube oscillation-generator system that may be employed in wireless transmission systems.

One object of my invention is to provide an oscillation generator of the above indicated character that shall be simple in construction, reliable in operation and of a higher efficiency than has heretofore been obtained in such tubes.

Another object of my invention is to provide an oscillation generator system which may be energized from single-phase or polyphase alternating currents.

Still another object of my invention is to provide an oscillation generator system in which certain electrodes within the tube may be caused to serve, alternately, as anodes and as cathodes, and in which the necessity for the filament heating currents usually supplied to such tubes during the normal operation thereof may be avoided.

The well known type of oscillation generator system employing an oscillator tube having a single anode, a single cathode and a single control electrode therein is not adapted to generate continuous oscillatory currents when excited by alternating currents. As can readily be seen, such tubes are inoperative during those portions of the impressed voltage waves when the plate voltage is negative in value.

I have found, however, that by employing an oscillator tube, as hereinafter described, an improved oscillation generator system may be obtained which admits of excitation from single-phase or polyphase sources of energy, and which generates high-frequency currents such as are employed in wireless systems.

Briefly speaking, the oscillation generator embodying my invention comprises a plurality of electrodes which are disposed in a circular arrangement. Corresponding surfaces of each electrode are coated with a thermionically active material. Alternate electrodes are connected in parallel to form two groups which are connected to a source of energy, and to an oscillatory circuit, of well known form. Filaments are disposed between the electrodes and may be selectively caused to serve as heating elements to render the electrodes initially thermionically active, or to serve as control electrodes, in a manner well known to the art.

In the operation of my invention, alternate plates alternately serve as anodes for the preceding electrodes and as cathodes for the next succeeding electrodes, or vice versa, thereby being continuously maintained in a thermionically active state by electron bombardment.

Other objects, as well as details of construction, whereby my invention may be practiced, will be apparent from the following description, taken in connection with the accompanyng drawing, wherein:

The single figure is a diagrammatic view of circuits and apparatus embodying my invention, the vacuum tube being shown in cross-section.

In the drawing, I have shown an evacuated electric device 1 of annular shape having a plurality of alternately disposed electrodes 2 and 3 therein. The several electrodes 2 are connected in parallel relation by a conductor 4 and the several electrodes 3 are similarly connected by a conductor 5, leads 6 and 7 serving as connections between the electrodes 2 and 3 and the conductors 4 and 5, respectively. In addition, filamentary elements 8 and 9 are alternately disposed between each pair of electrodes 2 and 3. The mid-points of the filaments 8 and 9 are connected by leads 11 and 12 to conductors 13 and 14, respectively.

Opposite terminals of the filament elements 8 are connected in parallel relation by conductors 15, 15 and opposite terminals of the filament elements 9 are similarly connected by conductors 16, 16.

The parallel-connected plates 2 and 3 may be excited from a source of alternating currents (not shown) through a transformer 17 having a primary winding 18 and a secondary winding 19, and reactors 21 which are connected in series with the secondary winding 19. Energy may be supplied to the filament elements 8 and 9 by means of conductors 22, 22 and 23, 23 respectively, opposite terminals of which are connected to tertiary windings 24 and 25, respectively, of the transformer 17, and to the conductors 15, 15 and 16, 16, respectively. Switches 26 may be connected in the conductors 22 and 23 to selectively control the circuits.

The plates 2 and 3, which are connected in parallel to form two groups by conductors 4 and 5, are also connected by conductors 27 and 28, respectively, to intermediate points 29 and 31 on a coupling coil 32. The conductors 13 and 14, which connect alternate midpoints of the filaments 8 and 9, are connected by conductors 34 and 33 to opposite terminals of the coupling coil 32.

It will be noted that the filaments 8 and 9 have been so connected with respect to the portion of the coupling coil included between the intermediate contact points 29 and 31 that opposite electromotive-forces are impressed upon corresponding filaments and plates. The plate electrodes have corresponding surfaces 36 coated with a heat-responsive electron emitting substance, such as the rare-earth oxides, whereby the two surfaces of each plate have different electron-emissivities when heated. The coupling coil 32 is operatively associated with a coupling coil 35 which is included in an antenna circuit comprising antenna 36, the coupling coil 35 and a ground lead 37. The energy traversing the antenna circuit may be controlled by any means well known to the art.

In operation, switches 26 are first closed to admit of the passage of currents through the filaments, thereby heating the electrodes 2 and 3 and rendering them thermionically active, whereupon the switches 26 may be opened to permit the filaments to function as control electrodes. Upon the supply of alternating currents to the plate electrodes 2 and 3, it can readily be seen that each electrode alternately serves as an anode for the next preceding electrode and as a cathode for the next succeeding electrode, or vice versa, depending upon the polarities of the voltages impressed upon the electrodes. Thus the initially thermionically active state of the electrodes may be maintained by electron bombardment from adjoining plates.

During one half-wave of impressed voltage, when the electrodes 2 are positive in value with respect to the electrodes 3, the former electrodes are caused to function as anodes while the latter electrodes are caused to function as cathodes. In this case, the plate-cathode circuit extends from the anodes 2 through conductors 4 and 27, a portion 39 of the inductance coil 32 and conductors 28 and 5 to the cathodes 3. The grid-cathode circuits extend from the filament elements 8 through conductors 13 and 34, a portion 42 of the coil 32 and conductors 28 and 5 to the cathodes 3. Thus, assuming a proper adjustment of the constants of the oscillatory circuits, during one half wave of the impressed electromotive force, modulated high-frequency oscillations are generated by the system in accordance with the well known theory of operation of three-electrode oscillation generator systems.

During the remaining half-wave of the impressed voltage, the electrodes 3 serve as anodes while the electrodes 2 serve as cathodes. The plate-cathode circuit, as before, includes the portion 39 of the coupling coil 32 but extends from the anodes 3 to the cathodes 2. The grid-cathode circuit now includes portion 41 of the coupling coil 32 and extends from the filament elements 9 to the cathodes 2. Thus, modulated oscillatory currents may again be generated by the system during the remaining half of the impressed voltage wave.

The effect, therefore, of impressing alternating currents upon the oscillation generator system embodying my invention is to produce oscillatory currents of radio frequency during both halves of the impressed voltage wave.

From the foregoing description, it will be seen that one advantage of my invention is the provision of a vacuum tube employing electrodes which serve alternately as equipotential anodes and as equipotential cathodes, and which are maintained continuously in a thermionically active state by electron bombardment, thereby eliminating the customary supply currents to the electron emitting element.

While I have shown only one embodiment of my invention for the purpose of disclosing my invention and explaining the principles thereof, other forms of embodiment and application will readily suggest themselves to those skilled in the art. I therefore desire that only such restrictions shall be placed upon my invention as are set forth in the appended claims.

I claim as my invention:

1. An electronic device embodying a plurality of serially disposed electrodes, the opposite sides of each electrode having such characteristics that they are maintained in different degrees of electron-emissivity by the passage of an arc current therebetween, and connections including a source of alternating potential whereby each electrode alternately serves as a cathode for the electrode on one side thereof and as an anode for the electrode on the other side thereof.

2. An electronic device embodying a plurality of serially disposed electrodes, the opposite sides of each electrode having such characteristics that they are maintained in different degrees of electron-emissivity by the passage of an arc current therebetween, means for connecting alternate electrodes in parallel, forming two groups, and means for applying an alternating electromotive-force between said groups.

3. An electronic device embodying two electrodes having different electron-emissivity characteristics, said electrodes being of a type in which the electron-emitting condition is maintained under operating conditions by space-current electron-bombardment, an auxiliary electrode and changeable connections whereby at times said auxiliary electrode is adapted to render said first-named electrodes electronically active and at other times to act as a control electrode.

4. The method of operating an electronic device having two electrodes with different electron emissivities at temperatures prevailing during operating conditions and an auxiliary electrode, which consists in causing said two electrodes to be heated initially by the auxiliary electrode and subsequently causing said auxiliary electrode to act as a control electrode.

5. The method of operating an electronic device having two electrodes with different electron emissivities at temperatures prevailing during operating conditions and an auxiliary electrode, which consists in supplying energy to said auxiliary electrode to heat the same and thereby starting the space-current flow and subsequently stopping said supply of heating energy and applying potential to said auxiliary electrode to cause it to control said space-current flow.

6. An electronic device having a plurality of space-current paths disposed in a serial arrangement and electrodes individual to said space-current paths, each electrode alternately serving as an anode for the preceding electrode and as a cathode for the succeeding electrode.

7. An electronic device having a series of electrodes disposed in a substantially circular arrangement, said electrodes having corresponding surfaces coated with thermionically active substances, each of said electrodes being maintained thermionically active by electron bombardment from the next preceding electrode and alternately serving as an anode for the preceding electrode and as a cathode for the succeeding electrode.

8. An electronic device having a plurality of space-current paths disposed in a substantially circular arrangement, electrodes individual to said space-current paths, said electrodes being maintained thermionically active by electron bombardment, each electrode alternately serving as an anode for the preceding electrode and as a cathode for the succeeding electrode, and a control electrode for each of said space-current paths.

9. An electronic device having a plurality of space-current paths disposed in a serial arrangement, electrodes individual to said space-current paths, said electrodes having corresponding surfaces coated with thermionically active substances, a control electrode for each of said space-current paths and means for causing said control electrodes to render said first-named electrodes thermionically active.

10. An electronic device having a plurality of space-current paths disposed in a substantially circular arrangement, electrodes individual to said space-current paths, said electrodes having corresponding surfaces coated with thermionically active substances, a control electrode for each of said space-current paths and means whereby said control electrodes may be selectively caused to render said first-named electrodes thermionically active by heat-radiation or to serve as a control electrode.

11. An electronic device having a plurality of space-current paths disposed in a serial arrangement, electrodes individual to said space-current paths, said electrodes being maintained thermionically active by electron bombardment, each electrode alternately serving as an anode for the preceding electrode and as a cathode for the succeeding electrode and a control electrode disposed intermediate each pair of electrodes.

12. In an electronic device, a plurality of electrodes extending radially outwardly from a common center, said electrodes having corresponding surfaces coated with thermionically active substances, alternate electrodes alternately serving as anodes for the preceding electrodes and as cathodes for the succeeding electrodes and control electrodes interposed between said first-named electrodes.

13. An evacuated electric device comprising a plurality of space-current paths, electrodes individual to said space-current paths, said electrodes having corresponding surfaces rendered electrionically active, means for connecting alternate electrodes in parallel relation, control electrodes for said space-current paths, means for connecting alternate control electrodes in parallel, a source of alternating current for energizing said space-current paths and circuits containing inductance and capacitance connected to said electrodes, whereby said evacuated electric device may function as an oscillation generator.

14. An evacuated electric device comprising a plurality of space-current paths, electrodes individual to said space-current paths, alternate electrodes being connected in parallel to form two groups, control electrodes for said space current paths, alternate control electrodes also being connected in parallel relation to form two groups, a source of alternating current for said space-current paths and circuits containing inductance and capacitance operatively associated with said electrodes, whereby one group of electrodes may serve as cathode elements and the remaining group as anode elements during one half of the impressed electromotive force and the functions of said groups are interchanged during the remaining half wave, to cause the generation of oscillatory currents in said circuits.

15. An evacuated electric device comprising a plurality of space-current paths, electrodes individual to said space-current paths, said electrodes having corresponding surfaces coated with thermionically active material, alternate electrodes being connected in parallel to form two groups, control elements for said space-current paths, alternate control elements being connected in parallel to form two groups, a source of alternating current operatively associated with said groups of electrodes, circuits containing inductance and capacitance associated with said space-current electrodes and with said control elements, whereby the space-current electrodes of each group thereof may alternately serve as anodes for the next preceding electrodes and as cathodes for the next succeeding electrodes to cause the generation of oscillatory currents in said circuits.

16. An evacuated electric device comprising a plurality of space-current paths, electrodes individual to said space current paths, alternate electrodes being connected in parallel to form two groups, control elements for each space-current path, alternate control elements being connected in parallel to form two groups, a source of alternating currents associated with said groups of electrodes, said electrodes being maintained thermionically active by electron bombardment, circuits containing inductance and capacitance associated with said electrodes and said control elements, whereby one group of electrodes may serve as cathodes and the remaining group as anodes during one half-wave of the impressed electromotive force and the functions of said groups are interchanged during the remaining half-wave.

17. An evacuated electric device comprising a plurality of space-current paths, electrodes individual to said space-current paths, alternate electrodes being connected in parallel to form two groups, control elements for each space-current path, alternate control elements being connected in parallel to form two groups, a source of alternating currents associated with said groups of electrodes, means for energizing said control elements to cause said electrodes to be rendered initially thermionically active by electron bombardment, circuits containing inductance and capacitance associated with said electrodes and said control elements, said electrodes having different electron-emissivities on different sides, whereby each group of electrodes may alternately serve as anodes for the next preceding electrodes and as cathodes for next succeeding electrodes to cause the generation of oscillatory currents in said circuits.

In testimony whereof, I have hereunto subscribed my name this first day of July, 1921.

VLADIMIR K. ZWORYKIN.